UNITED STATES PATENT OFFICE.

PAUL R. SCHREURS AND GEORGE F. METZ, OF MUSCATINE, IOWA, ASSIGNORS TO THE PRESSLOID COMPANY, OF MUSCATINE, IOWA, A CORPORATION OF IOWA.

PEARL-SHELL COMPOSITION.

1,252,850.  Specification of Letters Patent.  Patented Jan. 8, 1918.

No Drawing.  Application filed May 18, 1917. Serial No. 169,530.

*To all whom it may concern:*

Be it known that we, PAUL R. SCHREURS and GEORGE F. METZ, citizens of the United States, residing at Muscatine, in the county of Muscatine and State of Iowa, have invented certain new and useful Improvements in Pearl-Shell Composition; and we hereby declare that the following is a full, clear, and exact description thereof.

This invention is a novel composition especially adapted for use in the arts in the production of various articles of manufacture such as are now commonly made of celluloid, hard rubber, porcelain and other compositions, and in some cases of metal.

The particular object of the invention is to utilize the at present waste products of the manufacture of pearl buttons from fresh water mussel pearl shells, and from salt water pearl shells.

There is a very large amount of waste in cutting blanks from such shells, particularly the fresh water shells, which waste consists in pieces of shell too thin or too thick to work up into buttons, and in grit and powder produced in sawing the blanks, and in finishing the blanks into buttons. The coarse waste is of little commercial value; though attempts have been made to utilize it by pulverizing it into grit for poultry. The powder produced in the cutting and finishing of pearl buttons, and particularly by the grinding of the button blanks, is very deleterious to health and a source of great annoyance and trouble to the button manufacturers, and has hitherto been entirely worthless commercially.

By our invention all such waste shell may be advantageously used and made of value in the production of a novel composition for use in the arts and manufactures in place of other materials and substances; thereby converting such hitherto absolutely waste portions of the pearl shells and pearl powder into a valuable commercial product.

We have discovered that this pearl shell waste when reduced to a powdered form can be mixed with a resin, the mass being slightly heated while being mixed, and the mass can be compressed while so heated, producing a new composition which while warm may be molded or pressed into various articles of manufacture, such as buttons and the like. Such product becoming exceedingly solid, hard and tough when cold. While warm the product can be pressed into mass sheets, rods, bars or other forms to be subsequently cut into articles; and such mass products may be subsequently softened by heating sufficiently to enable them to be pressed or molded into various articles of manufacture.

The coarse pearl shell waste can be reduced to powder by suitable mechanical means, and such powder utilized in the same way as the waste powder in the production of the novel composition or product.

A very efficient product can be produced by taking approximately 86 pounds of pearl shell powder, 8 pounds of rosin, 4 pounds shellac, one pound of stearin, and if desired 1 pound of a suitable pigment or coloring substance. These ingredients should be thoroughly mixed and warmed sufficiently to enable the resins, and stearin, to be uniformly distributed through and combined with the particles of powder to form a homogeneous mass.

We preferably use both resin and shellac to lessen the cost of the resin in the composition. In some cases the stearin and coloring or pigment might be omitted, but the resultant product would be correspondingly affected. In some cases an emollient, such as other animal fats, or paraffin or equivalent mineral grease or oil might be used as a substitute for stearin in the composition.

The novel product can be pressed while warm into any desired article of manufacture for which the composition may be suitable; or the product can be rolled into sheets or bars or bodies of any desired kind and used in such forms for any desired purpose; or have objects cut therefrom; or the product can be subsequently reheated until it again becomes slightly plastic and then be pressed or stamped into the desired objects.

The composition is particularly well adapted for use in making many articles and for many purposes in the arts for which porcelain, celluloid, hard rubber, natural ivory, bone, etc., have been used. And there are many purposes in the mechanical and electrical arts for which the novel composition can be usefully employed.

The invention is a great economical factor, as it utilizes the hitherto entirely waste and useless portions of pearl shell, and pearl shell powder, which have caused a great deal of trouble and annoyance to pearl button manufacturers; and which powder has heretofore been considered an altogether undesirable and useless product.

What we claim is:

1. A composition for the purpose specified having as a base pearl shell powder, and a binder.

2. A composition for the purpose specified comprising pearl shell powder and resin, substantially as described.

3. A composition for the purpose specified comprising pearl shell powder, resin and an emollient.

4. A composition for the purpose specified comprising pearl shell powder, resin and stearin.

5. A composition comprising pearl shell powder, rosin and shellac.

6. A composition comprising pearl shell powder, rosin, shellac and an emollient.

7. A composition comprising pearl shell powder, rosin, shellac and stearin.

8. The herein described composition comprising approximately 86 parts of pearl shell powder and 12 parts of a binder.

9. The herein described composition comprising approximately 86 parts of pearl shell powder and 12 parts of a resin.

10. The herein described composition comprising approximately 86 parts of pearl shell powder, 12 parts of resin, and an emollient.

11. The herein described composition comprising approximately 86 parts of pearl shell powder, 12 parts of resin, and one part of stearin.

12. The herein described composition comprising approximately 86 pounds of pearl shell powder, 8 pounds of rosin and 4 pounds of shellac.

13. The herein described composition comprising approximately 86 pounds of pearl shell powder, 12 pounds of a binder, one pound each of stearin and pigment.

14. The herein described composition comprising approximately 86 pounds of pearl shell powder, 8 pounds of rosin, 4 pounds of shellac, one pound of stearin, and a pigment.

In testimony that we claim the foregoing as our own, we affix our signatures.

PAUL R. SCHREURS.
GEORGE F. METZ.